United States Patent
Ellenberg et al.

(10) Patent No.: US 10,344,723 B2
(45) Date of Patent: Jul. 9, 2019

(54) HIGH-PRESSURE CONNECTOR FOR A FUEL DELIVERY SYSTEM

(71) Applicant: Continental Automotive GmbH, Hannover (DE)

(72) Inventors: Andreas Ellenberg, Gangloffsoemmern (DE); Eyk Heinemann, Cham (DE); Florian Reisinger, Roding (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 15/119,245

(22) PCT Filed: Sep. 15, 2015

(86) PCT No.: PCT/EP2015/071111
§ 371 (c)(1),
(2) Date: Aug. 16, 2016

(87) PCT Pub. No.: WO2016/041973
PCT Pub. Date: Mar. 24, 2016

(65) Prior Publication Data
US 2017/0248107 A1    Aug. 31, 2017

(30) Foreign Application Priority Data
Sep. 16, 2014  (DE) .......................... 10 2014 218 512

(51) Int. Cl.
*F02M 55/00*    (2006.01)
*F02M 59/44*    (2006.01)
(Continued)

(52) U.S. Cl.
CPC ........ *F02M 55/005* (2013.01); *F02M 55/004* (2013.01); *F02M 55/025* (2013.01);
(Continued)

(58) Field of Classification Search
CPC .... F02M 55/025; F02M 55/004; F02M 55/02; F02M 59/06; F02M 59/462; F02M 59/48;
(Continued)

(56) References Cited

U.S. PATENT DOCUMENTS

| 7,246,601 B2 | 7/2007 | Yamamoto et al. .......... 123/456 |
| 8,419,073 B2 * | 4/2013 | Harhoff ................ F02M 55/025 |
| | | 123/456 |

(Continued)

FOREIGN PATENT DOCUMENTS

| DE | 10162203 A1 | 7/2003 | ............. F02M 55/00 |
| DE | 10322595 A1 | 12/2004 | ............. F02M 59/44 |

(Continued)

OTHER PUBLICATIONS

German Office Action, Application No. 102014218512.2, 9 pages, dated Jun. 24, 2015.
(Continued)

*Primary Examiner* — George C Jin
(74) *Attorney, Agent, or Firm* — Slayden Grubert Beard PLLC

(57) ABSTRACT

The present disclosure relates to fuel delivery systems for a motor vehicle. Some embodiments include a housing with a wall and a connector opening, a high-pressure connector including a wall circumferentially bordering a recess extending along a longitudinal central axis of the high-pressure connector, a radial indentation formed at the inner side in the wall in the housing connector region adjacent to the transition region, and an axial indentation formed at the outer side in the wall in the transition region adjacent to the intermediate region. The high-pressure connector may have a housing connector region, an intermediate region, and a transition region. An outer diameter of the high-pressure connector is larger in the housing connector region than in
(Continued)

the intermediate region and the inner diameter is larger in the housing connector region than in the intermediate region. The wall of the housing delimits a recess around the connector opening. The housing connector region includes a protruding region suitable for making contact with the housing when said protruding region partially or fully enters the recess.

18 Claims, 8 Drawing Sheets

(51) Int. Cl.
*F02M 55/02* (2006.01)
*F16L 41/02* (2006.01)
(52) U.S. Cl.
CPC .............. *F02M 59/44* (2013.01); *F16L 41/02* (2013.01); *F02M 2200/03* (2013.01); *F02M 2200/8084* (2013.01)
(58) Field of Classification Search
CPC .................. F04B 1/0421; F04B 53/162; Y10T 29/49968; Y10T 29/49231
See application file for complete search history.

(56) References Cited

U.S. PATENT DOCUMENTS 8,474,436 B2   7/2013  Mancini et al. .............. 123/446

8,672,652 B2      3/2014  Munakata et al. ............ 417/437
2006/0054139 A1*  3/2006  Yamamoto ........... F02M 55/025
                                                    123/468

FOREIGN PATENT DOCUMENTS

| | | | |
|---|---|---|---|
| DE | 102005043015 A1 | 4/2006 | .............. B23K 11/00 |
| DE | 102008013575 B3 | 8/2009 | .............. F02M 55/02 |
| DE | 102012005921 A1 | 9/2013 | .............. F02M 55/02 |
| EP | 2236809 B1 | 8/1917 | .............. F02M 59/06 |
| EP | 2388470 A1 | 11/2011 | .............. B23K 33/00 |
| JP | 59187183 A | 10/1984 | .............. B23K 31/00 |
| JP | 62108982 U | 7/1987 | .............. A63F 7/02 |
| JP | 64014986 U | 1/1989 | .............. F16L 13/04 |
| JP | 8108259 A | 4/1996 | .............. B22D 17/20 |
| JP | 2007177725 A | 7/2007 | .............. F02M 47/02 |
| JP | 2009108784 A | 5/2009 | .............. B23K 20/00 |
| JP | 2011080391 A | 4/2011 | .............. F02M 59/44 |
| JP | 2012255433 A | 12/2012 | .............. F02M 59/36 |
| WO | 2016/041973 A1 | 3/1916 | .............. F02M 55/00 |
| WO | 2016/184599 A1 | 11/1916 | .............. F02M 55/00 |

OTHER PUBLICATIONS

International Search Report and Written Opinion, Application No. PCT/EP2015/071111, 17 pages, dated Dec. 8, 2015.
Japanese Office Action, Application No. 2016570188, 4 pages, dated Sep. 11, 2017.
Korean Office Action, Application No. 2017088642372, 21 pages.
Korean Notice of Allowance, Application No. 2018036944382, 3 pages, dated May 31, 2018.

* cited by examiner

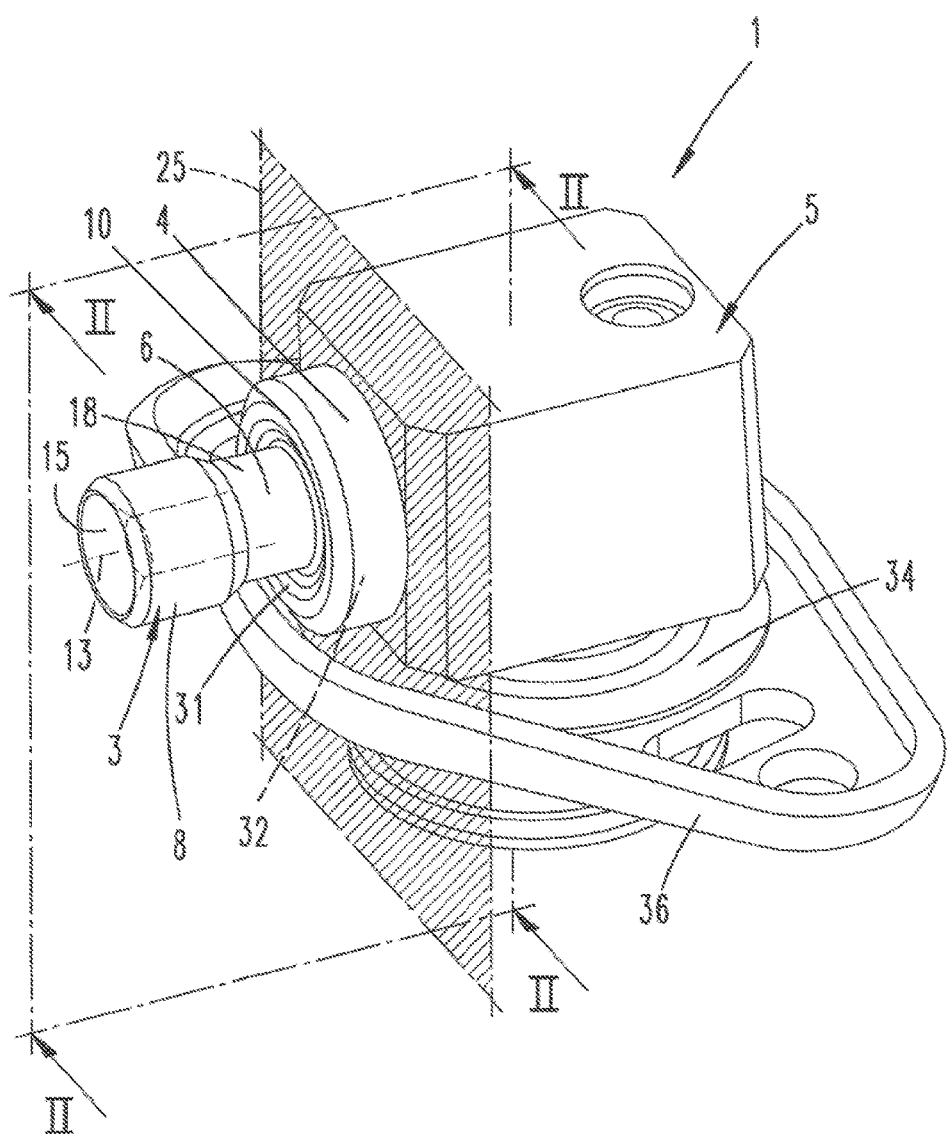

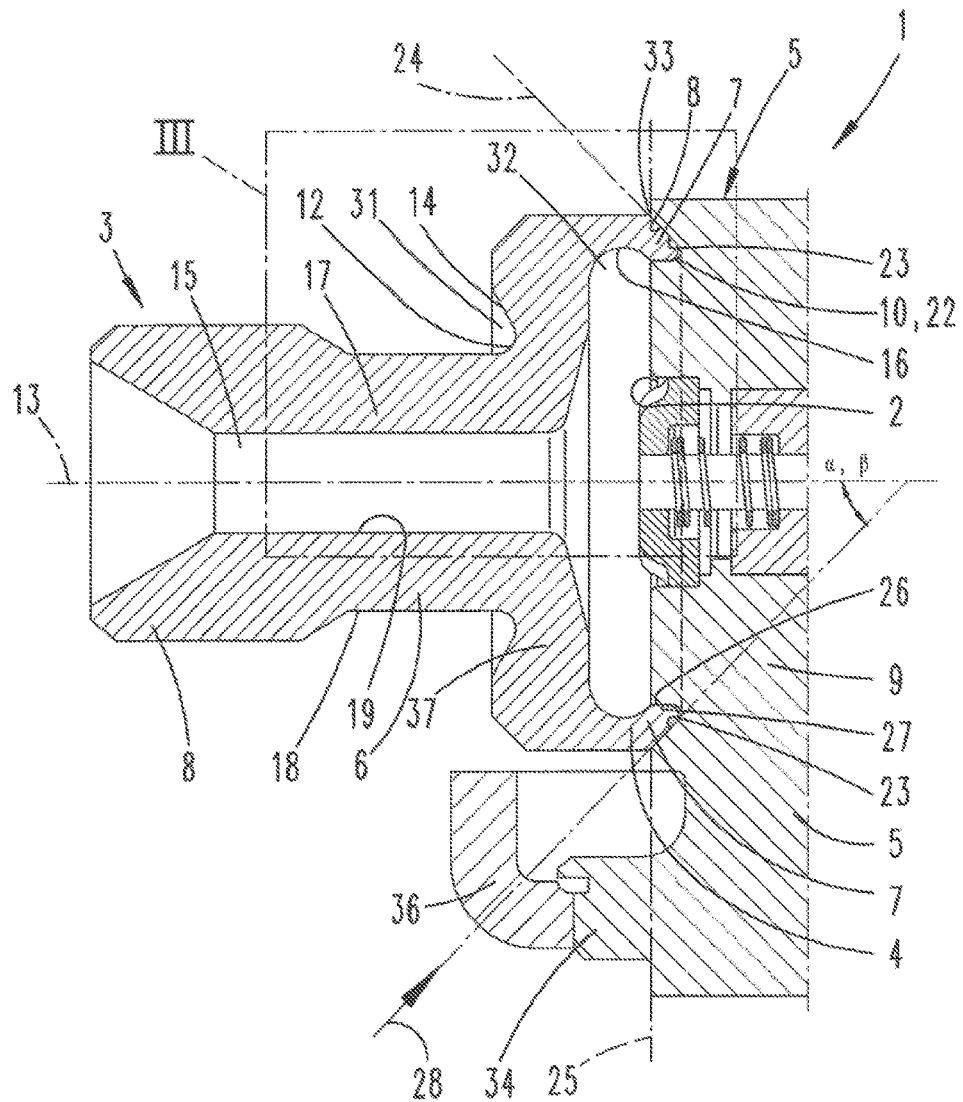

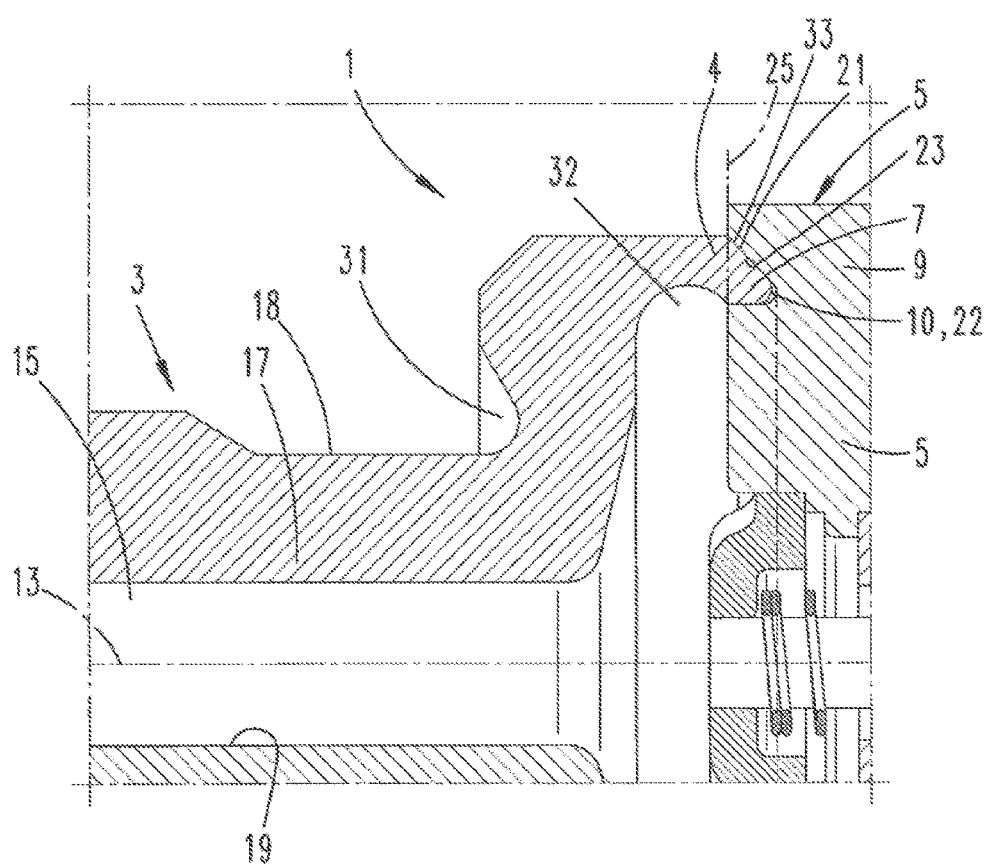

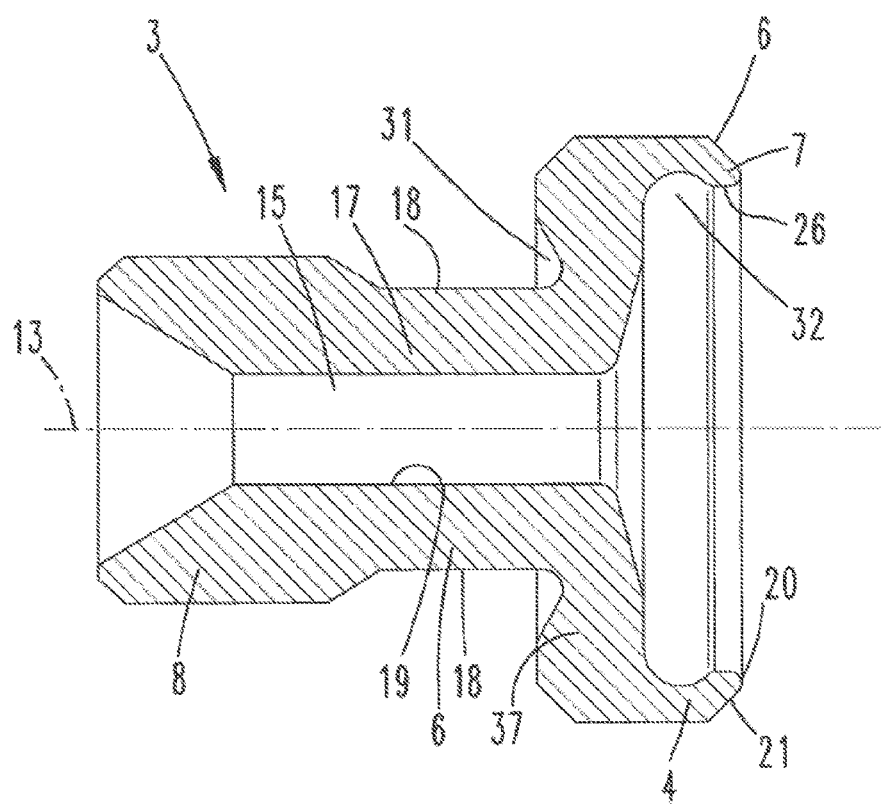

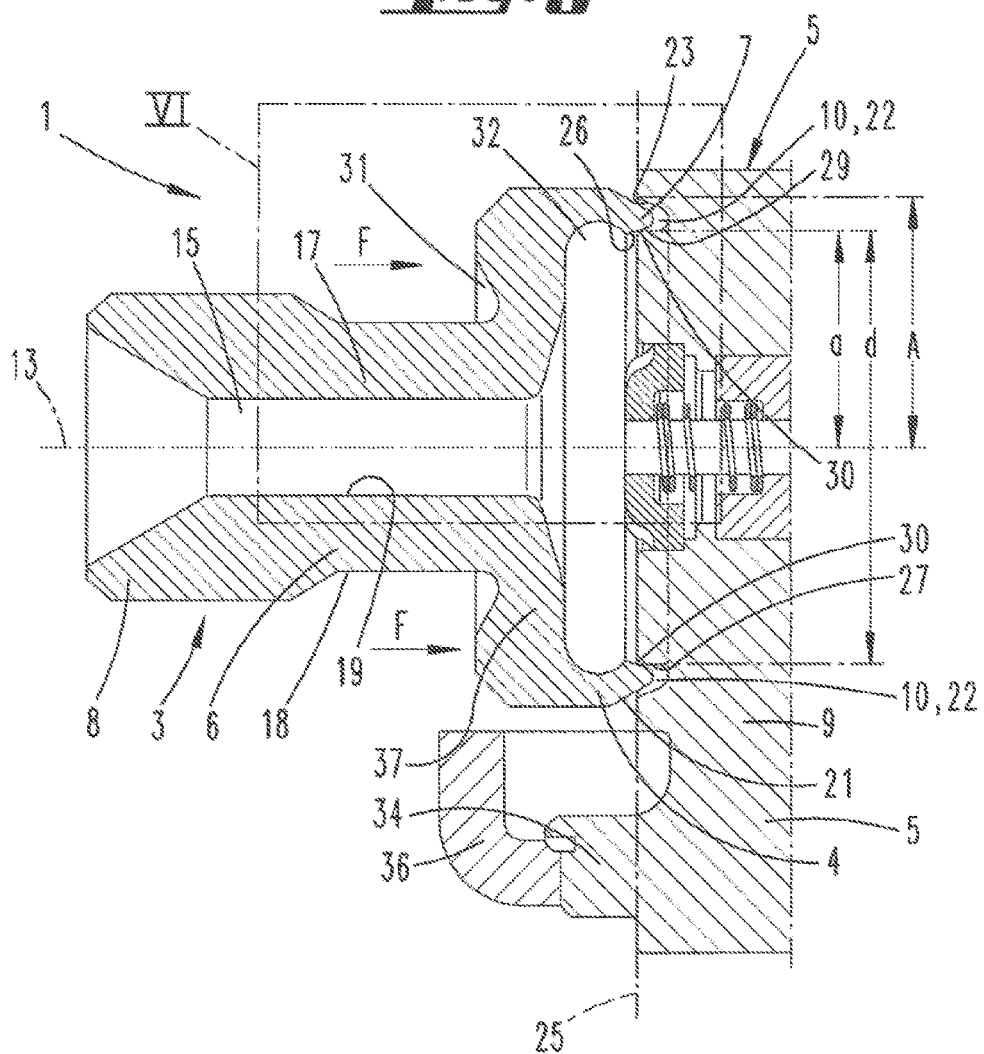

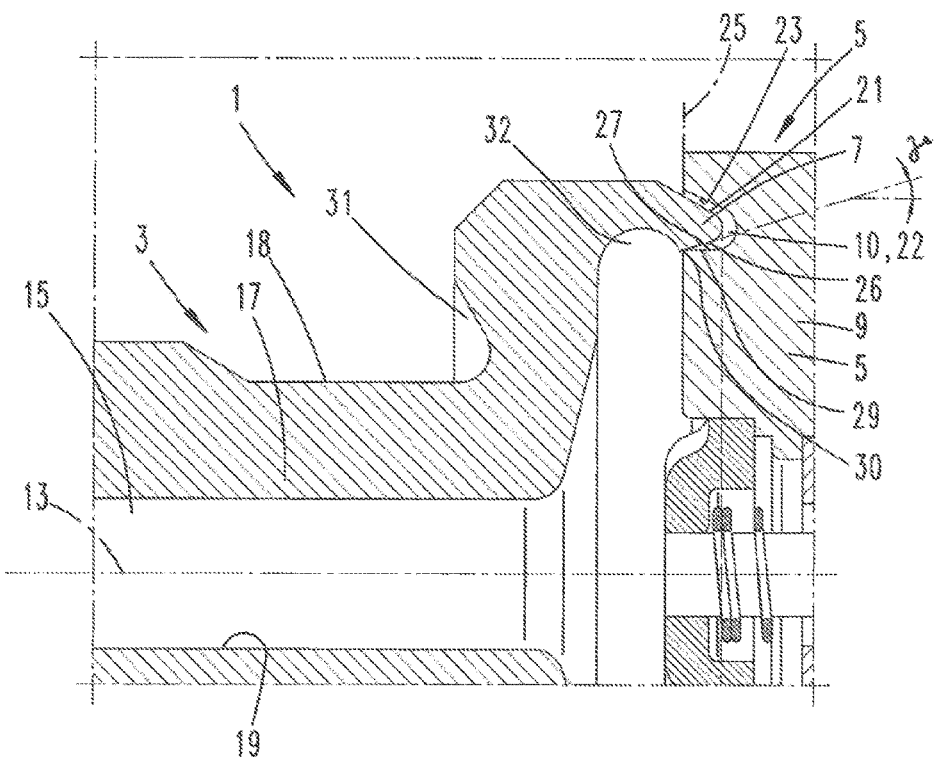

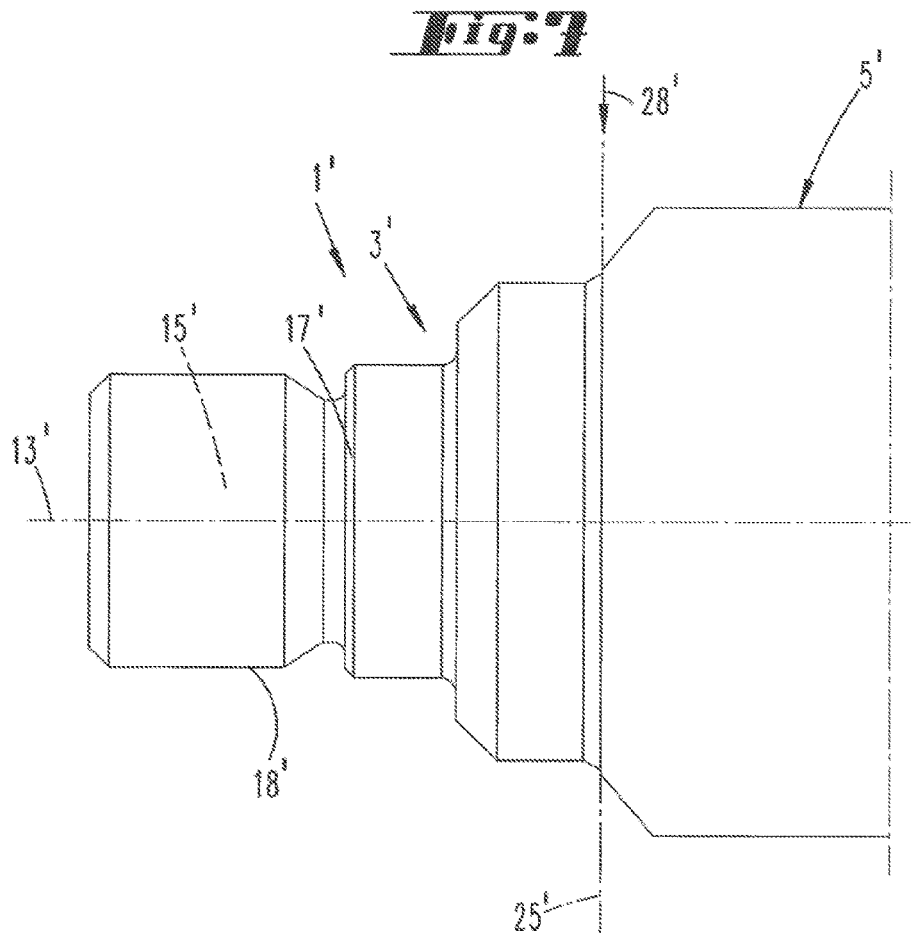

HIGH-PRESSURE CONNECTOR FOR A FUEL DELIVERY SYSTEM

CROSS-REFERENCE TO RELATED APPLICATIONS

This application is a U.S. National Stage Application of International Application No. PCT/EP2015/071111 filed Sep. 15, 2015, which designates the United States of America, and claims priority to DE Application No. 10 2014 218 512.2 filed Sep. 16, 2014, the contents of which are hereby incorporated by reference in their entirety.

TECHNICAL FIELD

The present disclosure relates to fuel delivery systems for a motor vehicle. The teachings may be applied to high-pressure connectors for use therein.

BACKGROUND

An arrangement, known from the prior art, is schematically shown in FIG. 7, wherein reference will also be made to the following description relating thereto. The housing front plane forms a parting joint between the high-pressure connector and the housing, which parting joint is freely accessible from the outside for the production of a welded connection. The high-pressure connector, which is fixedly connected to the pump housing by welding (e.g., electron beam/laser beam), is, in and adjacent to the weld seam, mechanically highly loaded by the forces and stresses that are generated in the high-pressure connector as a result of the high pump pressure that arises. Fluctuating tensile stress peaks that arise here may, in the case of adverse construction and dimensioning of the high-pressure connector, lead inter alia to a failure of the dynamically loaded weld seam (entirely or in parts).

SUMMARY

Since a weld seam as described above performs the function of a seal, failure of the seam can consequently lead to an escape of fuel and associated safety problems, and must therefore be avoided. The magnitude of the mechanical loads that arise is dependent inter alia on the magnitude of the positive pressure that arises in the hollow interior during operation (in relation to the pressure prevailing outside), and on the size, as viewed in an axial projection in the interior of the recess or passage opening of the high-pressure connector, of the surface areas on which the operating pressure acts.

In particular, if, in the interior of the high-pressure connector, such projected axial surface areas which face toward the housing are larger than the projected axial surface areas which face away from the housing, high stresses arise at the connection between the high-pressure connector and the housing. A construction which is assumed to be optimal therefore attempts, through minimization of the projected axial surface area, and by way of an operationally robust construction that can withstand the loading, to minimize the loads acting on the weld seam.

Therefore, a high-pressure connector is known (cf. FIG. 7) in which, by way of a beam welding process (for example electron beam or laser beam), a circular weld seam has been produced, with a beam direction perpendicular to the central axis of the high-pressure connector, or a radial beam direction, from the outside in the direction of the central axis, along the line of contact of the two parts to be connected. It was thus possible for the penetration depth during the welding process to be maximized, whereby in turn, the axially resultant mechanical stresses from the internal pressure loading were able to be reduced (in relation to a weld seam of lesser depth).

In practice, however, depending on requirements, the good external accessibility to the contact zone, such as exists in FIG. 7, is not always available. In particular, requirements relating to the assembly of the overall pump (for example in order to achieve relatively high pressures or in order to minimize costs) may necessitate a construction in which the beam direction shown in FIG. 7 can no longer be maintained, because it is no longer the case that all points on the circumference are accessible to the welding apparatus. To be able to continue to use a welding process and preferably a beam welding process for the attachment of the high-pressure connector, it has been attempted to modify the geometry of the housing connector region. Here, it is however necessary for certain geometric proportions to be adhered to. The difficulty exists whereby, in the course of possible structural modifications, depending on requirements, the projected axial inner surface in the high-pressure connector is also enlarged, and therefore the in particular axial force generated by the internal pressure loading, and the load exerted on the weld seam, are also increased.

In particular, it is sought for the limitations and disadvantages described above to thereby be as far as possible substantially avoided. To solve said problem, the disclosure herein proposes a high-pressure connector to have a housing connector region, an intermediate region and a transition region arranged between the housing connector region and the intermediate region, wherein, in cross-sectional planes perpendicular to the longitudinal central axis, the outer contour, in particular the outer diameter, of the high-pressure connector is larger in the housing connector region than in the intermediate region and, in cross-sectional planes perpendicular to the longitudinal central axis, the inner contour, in particular the inner diameter, is larger in the housing connector region than in the intermediate region.

In some embodiments, the wall of the housing delimits, at its outer side (in relation to the housing), a recess which runs along a circumferential direction, e.g., in a circumferentially closed fashion, around the connector opening, and for the housing connector region to have a protruding region which for the production of the weld seam, is suitable for making contact with the housing when said protruding region partially or fully enters the recess.

Some embodiments may include an arrangement (1), in particular for a fuel delivery system for a motor vehicle, having a housing (5) and having a high-pressure connector (3) for fixing to the housing (5) by way of a welding process. The housing (5) comprises a wall (9) which has a connector opening (2). The high-pressure connector (3) has a wall (17) circumferentially bordering a recess (15) which extends along a longitudinal central axis (13) in the high-pressure connector (3), in particular so as to lead through the high-pressure connector (3). The high-pressure connector (3) has a housing connector region (4), an intermediate region (6) and a transition region (37) formed between the housing connector region (4) and the intermediate region (6), wherein, in cross-sectional planes perpendicular to the longitudinal central axis (13), the outer contour, in particular the outer diameter, of the high-pressure connector (3) is larger in the housing connector region (4) than in the intermediate region (6) and, in cross-sectional planes perpendicular to the longitudinal central axis (13), the inner contour, in particular the inner diameter, is larger in the housing connector region (4) than in the intermediate region (6). The wall (9) of the housing (5) delimits, at its outer side, a recess (10) which runs along a circumferential direction, in particular in circumferentially closed fashion, around the connector opening (2), and the housing connector region (4) has a protruding region (7) which is suitable for making contact with the housing (5) when said protruding region partially or fully enters the recess (10). A radial indentation (32) is formed at the inner side in the wall (17) in the housing connector region (4), in particular adjacent to the transition region (37). An axial indentation (31) is formed at the outer side in the wall (17) in the transition region (37), in particular adjacent to the intermediate region (6).

Some embodiments may include an arrangement (1), in particular for a fuel delivery system for a motor vehicle, having a housing (5) and having a high-pressure connector (3) for fixing to the housing (5) by way of a welding process. The housing (5) comprises a wall (9) which has a connector opening (2). The high-pressure connector (3) has a wall (17) circumferentially bordering a recess (15) which extends along a longitudinal central axis (13) in the high-pressure connector (3), in particular so as to lead through the high-pressure connector (3). The high-pressure connector (3) has a housing connector region (4), an intermediate region (6) and a transition region (37) formed between the housing connector region (4) and the intermediate region (6), wherein, in cross-sectional planes perpendicular to the longitudinal central axis (13), the outer contour, in particular the outer diameter, of the high-pressure connector (3) is larger in the housing connector region (4) than in the intermediate region (6) and, in cross-sectional planes perpendicular to the longitudinal central axis (13), the inner contour, in particular the inner diameter, is larger in the housing connector region (4) than in the intermediate region (6). The wall (17) of the high-pressure connector (3) delimits, at its outer side facing toward the housing (5), a recess (10) which runs along a circumferential direction, in particular in circumferentially closed fashion, around the recess (15). The wall (9) of the housing (5) has a protruding region (7) which is suitable for making contact with the high-pressure connector when said protruding region partially or fully enters the recess (10). A radial indentation (32) is formed at the inner side in the wall (17) in the housing connector region (4), in particular adjacent to the transition region (37). An axial indentation (31) is formed at the outer side in the wall (17) in the transition region (37), in particular adjacent to the intermediate region (6).

In some embodiments, the high-pressure connector (3) is of rotationally symmetrical form.

In some embodiments, in cross-sectional planes leading through the central axis (13), the axial indentation (31) circumferentially has a contour with a rounded portion (12) proceeding from the outer side (18) of the wall (17) and with a straight portion (14) which adjoins the rounded portion (12) and which leads to the outer side (18) of the wall (17) of the transition region.

In some embodiments, in cross-sectional planes leading through the central axis (13), the radial indentation (32) circumferentially has an in particular continuously rounded contour (16).

In some embodiments, viewed in an axial projection, the radial indentation (32) is situated radially outside the axial indentation (31), and/or in that the radial indentation (32) adjoins the protruding region (7) and/or in that, in a direction parallel to the central axis (13), the axial indentation (31) is spaced apart further than the radial indentation (32) from that surface of the wall (9) of the housing (5) which faces toward the high-pressure connector (3), wherein it is provided in particular that the radial indentation (32) adjoins the surface of the wall (9) when the protruding region (7) has been inserted into the recess (10) running along the circumferential direction.

In some embodiments, the protruding region (7), at the outer side (18), narrows in particular conically in the direction of a free longitudinal end (20) of the protruding region (7), wherein it is provided in particular that, there, in cross-sectional planes leading through the central axis (13), the outer surface (21) of the protruding region (7) encloses an angle ($\alpha$) with an imaginary elongation of the central axis (13), the magnitude of which angle lies in the range from 10 to 80 degrees, in particular in the range from 30 to 60 degrees, in particular in the range from 40 to 50 degrees, and is in particular 45 degrees.

In some embodiments, the recess (10), which runs along the circumferential direction, in the wall (9) is in the form of a groove (22), and in that the ring-shaped chamber formed by the groove (22) narrows, in particular conically, at its outer side in the direction of the groove base.

In some embodiments, in cross-sectional planes leading through the central axis (13), that surface (23) of the wall (9) of the housing (5) which borders the outer side of the groove (22) encloses an angle ($\beta$) with an elongation of the central axis (13), the sign and magnitude of which angle ($\beta$) correspond to those of the angle ($\alpha$) enclosed by the outer surface (21) of the protruding region (7) with an elongation of the central axis (13), and in that said two surfaces (21, 23) extend in the same diameter interval.

In some embodiments, a geometric elongation, leading away from the housing (5), of the conical contact zone (24) between the outer side of the protruding region (7) and the outer side of the recess (10) running along the circumferential direction geometrically does not intersect the housing (5).

In some embodiments, the protruding region (7) has, on its inner side, a cylindrical surface (26), in that the recess (10), which runs along the circumferential direction, in the wall (9) is in the form of a groove (22) and, at its inner side, adjoins a cylindrical surface of the wall (9), and in that said two cylindrical surfaces (26, 27) have an equal or approximately equal diameter.

In some embodiments, in cross-sectional planes leading through the central axis (13), contours of the protruding region (7) and of the recess (10), which runs along the circumferential direction, in the wall (9) of the housing (5) are coordinated with one another such that the protruding region (7) is insertable or inserted entirely or partially into the recess (10), which runs along the circumferential direction, in such a way that said protruding region bears areally by way of its outer surface (21) against the outer surface (23) of the wall (9) in the recess (10) and bears areally by way of its inner surface (26) against the inner surface (27) of the wall (9) in the recess (10).

In some embodiments, when the protruding region (7) has been inserted as far as possible into the recess (10) which runs along the circumferential direction, there remains within the recess (10) a cavity which adjoins the free longitudinal end (20) of the protruding region (7).

In some embodiments, the protruding region (7) widens, in particular conically, at its inner side in the direction of a free longitudinal end (20) of the protruding region (7), wherein, there, in cross-sectional planes leading through the central axis (13), the inner surface (26) of said protruding region encloses an angle ($\gamma$) with the central axis (13), the magnitude of which angle lies in the range from 10 to 40 degrees and is in particular 30 degrees.

In some embodiments, the recess (10), which runs along the circumferential direction, in the wall (9) is in the form of a groove (22) and, at its inner side, adjoins a surface (29), which proceeds from the groove mouth, of the wall (9), which surface, in cross-sectional planes leading through the central axis (13), runs parallel to the central axis (13) or causes the ring-shaped chamber formed by the groove (22) to narrow, in particular conically, in the direction of the groove base by virtue of the fact that said surface encloses an angle with the central axis (13), the magnitude of which angle is less than the magnitude of the angle enclosed by the inner surface at the conical widening of the protruding region (7) with the central axis (13).

In some embodiments, the groove mouth has, at the inner side, a diameter (d) which lies in a diameter interval in which the inner surface (26) of the protruding region (7) extends.

In some embodiments, the protruding region (7) is inserted partially into the recess (10), which runs along the circumferential direction, of the wall (9), wherein the inner surface (26) of said protruding region is supported against the radially inner rim (30) of the groove mouth, and in that the shaping of the outer surfaces (21, 23) of the protruding region (7) and of the recess (10), which runs along the circumferential direction, in the wall (9) are coordinated with one another such that, in the presence of said support, said surfaces (21, 23) do not come into contact, wherein it is provided in particular that, in cross-sectional planes leading through the central axis, said surfaces (21, 23) enclose different angles with the central axis (13).

In some embodiments, the housing (5) and the high-pressure connector (3) are connected to capacitors of a capacitor discharge welding installation.

Some embodiments may include a method for producing an arrangement (1) for a fuel delivery system, comprising: providing an arrangement (1) as described above, arranging the housing (5) and the high-pressure connector (3) such that the protruding region (7) entirely or partially enters the recess (10), which runs along the circumferential direction, and said protruding region makes contact with the wall in which the recess (10) extends along the circumferential direction, and cohesively connecting the protruding region (7) and the wall, in which the recess (10) extends along the circumferential direction, by way of a welding process, wherein a fixed state is produced between the high-pressure connector (3) and the housing (5).

In some embodiments, the cohesive connection is performed by way of beam welding, in particular by way of electron beam welding or by way of laser beam welding, and in that, in relation to cross-sectional planes leading through the central axis (13), the welding beam is directed from the outside toward, and in an in particular rectilinear elongation of, an abutment joint (33) between the high-pressure connector (3) and the wall (9) in which the recess (10) extends along the circumferential direction.

In some embodiments, a capacitor discharge welding installation is provided and is connected to the high-pressure connector (3) and to the housing (5), and in that the cohesive connection is performed, by way of capacitor discharge welding, proceeding from the contact zone between the groove mouth in the wall (9) and the inner surface (26) of the protruding region (7).

Some embodiments may include a housing (5) with high-pressure connector (3) welded thereto, produced by way of a method as described above.

BRIEF DESCRIPTION OF THE DRAWINGS

The disclosure will be expanded below on the basis of the appended figures, wherein FIGS. 1 to 6 show exemplary embodiments of the teachings of the present disclosure, and FIG. 7 shows an arrangement known from the prior art. In the figures, in detail:

FIG. 1 shows, in a perspective view, an arrangement according to the teachings of the present disclosure;

FIG. 2 shows a partial section through the arrangement shown in FIG. 1, along section plane II-II;

FIG. 3 shows an enlargement of detail III from FIG. 2;

FIG. 4 shows, in a sectional view, only the high-pressure connector shown in FIGS. 1 to 3;

FIG. 5 shows, in a view similar to the section plane used in FIG. 2, according to the teachings of the present disclosure;

FIG. 6 shows an enlargement of detail VI from FIG. 5, but showing a geometry, slightly modified in relation to FIG. 5, as per a further exemplary embodiment, and FIG. 7 schematically shows, on the basis of the outer contours, an arrangement known from the prior art.

DETAILED DESCRIPTION

Figure 3A:
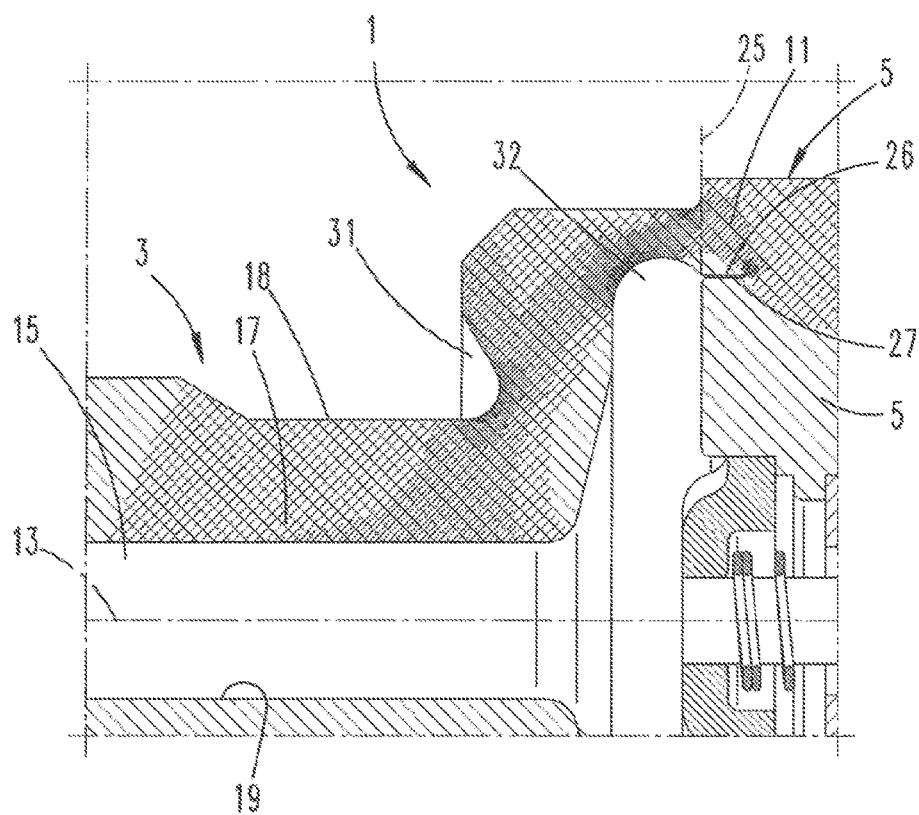
FIG. 3a shows an illustration similar to FIG. 3, in which the magnitude of the stresses is indicated schematically by way of different hatching.

In some embodiments, the wall of the high-pressure connector delimits, at its outer side facing toward the housing, a recess which runs along a circumferential direction, in particular in circumferentially closed fashion, around the recess, and the wall of the housing has a protruding region which is suitable for making contact with the high-pressure connector when said protruding region partially or fully enters the recess.

In some embodiments, a radial indentation may be formed at the inner side in the wall in the housing connector region, in particular adjacent to the transition region, and an axial indentation may be formed at the outer side in the wall in the transition region, in particular adjacent to the intermediate region.

The combination, of a protruding region with a recess formed on the wall, which faces said region, of the connecting partner makes it possible for the contact region to be designed, according to requirements, so as to be suitable and also accessible for a desired welding process. This makes it possible, even under adverse structural conditions, to be able to continue to use a welding process for the attachment of the high-pressure connector. In combination with this, an axial indentation (indentation in an axial direction, that is to say a direction parallel to the central axis) may be formed in a first region, and for a radial indentation (that is to say an indentation in a direction perpendicular to the central axis, or a radial direction) may be formed in a second region, in the wall of the high-pressure connector.

It has surprisingly been found by the applicant that such a combination of indentations is suitable for considerably reducing the mechanical stresses that act on the welded connection between the high-pressure connector and the housing, in relation to an arrangement which does not have the indentations but which otherwise corresponds to the described arrangement. This means that, even if, as a result of a desired design of the housing connector region (for example in order to improve the accessibility to the weld seam), an inherently relatively adverse situation with regard to loading were to arise, the combination of radial indentation and axial indentation gives rise to an advantageous effect which leads to the reduction of the mechanical stresses acting on the weld zone, such that, even in that situation, a reliable welded connection is made possible.

The combination of axial indentation and radial indentation has the effect that, when a predefined operating pressure builds up in the high-pressure connector during operation, from the outset, a stress distribution is generated which entails lower action of stresses on the weld seam in relation to a conventional high-pressure connector which does not have said indentations. In relation to a conventional high-pressure connector which does not have said combination of indentations, those wall regions which adjoin the indentations are, by contrast, subjected to relatively high stresses. Therefore, in a comparison of a conventional high-pressure connector with a high-pressure connector as disclosed herein, relatively different stress distributions are formed, which means that, figuratively speaking, it can be stated that, proceeding from a conventional high-pressure connector, it is the case in the high-pressure connector according to the invention that stresses are "relocated" from the weld seam into other zones, which are less highly loaded in the case of conventional high-pressure connectors.

In this way, the dynamic strength of the weld seam can be ensured, and at the same time, larger flexibility in the construction and production/assembly of the overall pump can be realized. It possible, therefore, to realize a geometry which is optimized both with regard to the connector geometry and the accessibility for a welding process and with regard to the mechanical loads that arise at the welded joint. Furthermore, depending on the embodiment, it may be the case that the radial indentation in combination with the axial indentation generates a limited amount of flexibility in the wall, such that, in the presence of high internal pressures, the wall deforms in a predetermined manner with regard to shape and extent, that is to say in a defined manner, wherein, depending on the embodiment, it is possible for a particular wall region of the high-pressure connector to react, figuratively speaking, in the manner of a joint, such that, accordingly, relatively low stresses arise at the weld seam and relatively high stresses arise at other regions which are otherwise subjected only to low load.

In this respect, the combination of the two indentations can have the effect that, in relation to a structural form without the two indentations, mechanical stresses are, figuratively speaking, "conducted away" from the weld seam. In this way, larger flexibilization of the assembly and/or welding process in the attachment of the high-pressure connector can be made possible even in the case of relatively complex installation conditions. The invention thus makes it possible, even in the presence of increased geometrical and mechanical demands, to realize an inexpensive welded connection. The invention may be used not only in conjunction with housings of pumps. It could also conceivably be used in high-pressure valve housings, for example in the case of valves for camshaft adjustment, servo valves in the high-pressure sector for industrial plants, construction machines etc.

As will be described below, these teachings also make it possible to realize an optimized construction which permits an angle of less than 90° between the central axis of the high-pressure connector and the welding beam direction or the connecting surfaces. This may be useful if fixtures on the housing, such as for example a collar on a pump housing for the attachment of a clamping flange, were to otherwise prevent accessibility to the parting joint for a welding head at a beam angle of 90° with respect to the central axis of the high-pressure connector. The invention thus makes it possible to realize a stress-optimized high-pressure connector even with a connector geometry which runs for example at 45°. Owing to the relatively reduced loading of the stress at the weld seam, the service life of said weld seam can be increased, and the risk of leaks can be reduced.

The disclosure describes the stated arrangement, which has a housing and a high-pressure connector, in the state in which these components have not yet been welded to one another. The disclosure also relates to a combination of the components produced from an arrangement of said type by way of a welding process, in the case of which combination the high-pressure connector is fixedly attached to the housing.

The stated central axis is a geometric or imaginary axis of infinite length, which leads in a longitudinal direction centrally through the recess of the high-pressure connector. Where angular relationships are discussed in the description below, a geometric elongation of the central axis will sometimes be referred to. It would however also be possible for the central axis to be referred to directly, if it is considered to be of infinite length.

The axial indentation (it would also be possible to refer more generally to an indentation) and the radial indentation each form a clearance, wherein this is not bound here in terms of meaning to the dimensions and proportions associated with the expression in technical rulebooks. The axial indentation forms an undercut in an axial direction, that is to say in a direction parallel to the central axis. The radial indentation forms an undercut in a direction perpendicular to the central axis, or in a radial direction. Instead of a radial indentation, it would also be possible to refer to an undercut. The radial indentation may be situated, in relation to a direction parallel to the central axis, between an inner side of the protruding region and the transition region. The protruding region on the high-pressure connector may be formed on the housing connector region and may extend along a circumferential direction around the central axis, preferably in circumferentially closed fashion. The intermediate region may be adjoined, at the longitudinal end facing away from the housing connector region, for example by a connector region for the connection of a fitting, line, or another connection partner.

In some embodiments, the high-pressure connector may be of rotationally symmetrical form. This applies to the inner side and to the outer side. The high-pressure connector may be designed as a sleeve or as a sleeve-like component.

In some embodiments, in cross-sectional planes leading through the central axis, the axial indentation circumferentially has a contour with a rounded portion proceeding from the outer side of the wall lying in the intermediate space and with a straight portion which adjoins the rounded portion and which leads to the outer side of the wall of the transition region. In said rounded portion, the outer surface of the wall is concavely domed in relation to said cross-sectional planes. Said outer surface may have a uniform or substantially uniform radius of curvature. It may be provided that, viewed in an axial projection (that is to say parallel to the central axis), the radial indentation is situated radially outside the axial indentation. The Radial indentation may adjoin the protruding region. It may be provided that, in a direction parallel to the central axis, the axial indentation is spaced apart further than the radial indentation from that surface of the wall of the housing which faces toward the high-pressure connector.

In some embodiments, the radial indentation adjoins the surface of the wall when the protruding region has been inserted into the recess running along the circumferential direction.

In some embodiments, the protruding region, at the outer side, narrows in particular conically in the direction of a free longitudinal end of the protruding region, wherein, in cross-sectional planes leading through the central axis, the outer surface of the protruding region encloses an angle with an imaginary elongation of the central axis, the magnitude of which angle lies in the range from 10 to 80 degrees, in particular in the range from 30 to 60 degrees, in particular in the range from 40 to 50 degrees, and is in particular 45 degrees.

In some embodiments, the arrangement is useful for the connection of housing and high-pressure connector by way of beam welding processes (for example electron beam or laser beam).

In some embodiments, the recess, which runs along the circumferential direction, in the wall is in the form of a groove, and that the ring-shaped chamber formed by the groove narrows, in particular conically, at its outer side in the direction of the groove base. In some embodiments, in cross-sectional planes leading through the central axis, the surface of the wall of the housing which borders the outer side of the groove encloses an angle with (an elongation of) the central axis, the sign and magnitude of which angle correspond to those of the angle enclosed by the outer surface of the protruding region with (an elongation of) the central axis, and that said two surfaces extend in the same diameter interval.

In some embodiments, a geometric elongation, leading away from the housing, of the conical contact zone between the outer side of the protruding region and the outer side of the recess running along the circumferential direction geometrically does not intersect the housing. This may improve all-round accessibility for a beam welding device. The two surfaces involved may entirely or partially overlap as viewed in a projection parallel to the central axis. The outer rim of the contact zones of said surfaces defines an externally visible profile for the weld seam that is yet to be produced.

In some embodiments, the protruding region has, on its inner side, a cylindrical surface, that the recess, which runs along the circumferential direction, in the wall is in the form of a groove and, at its inner side, adjoins a cylindrical surface of the wall, and that said two cylindrical surfaces have an equal or approximately equal diameter, which permits centering.

In some embodiments, in cross-sectional planes leading through the central axis, contours of the protruding region and of the recess, which runs along the circumferential direction, in the wall of the housing are coordinated with one another such that the protruding region is insertable or inserted entirely or partially into the recess, which runs along the circumferential direction, in such a way that said protruding region bears a really by way of its outer surface against the outer surface of the wall in the recess and bears a really by way of its inner surface against the inner surface of the wall in the recess. This may improve the attainment of a centering action and stable support.

In some embodiments, the beam direction may lie in an elongation of the joint direction. This may permit a maximization of the penetration depth during the welding process, whereby the stresses that act in the weld seam cross section are relatively low in relation to a relatively small weld seam cross section.

In some embodiments, when the protruding region has been inserted as far as possible into the recess which runs along the circumferential direction, there remains within the recess, owing to the mutually coordinated cross-sectional geometries of the protruding region and of the recess, a cavity which adjoins the free longitudinal end of the protruding region. By way of a cavity of said type, which in particular runs in encircling fashion along the circumference, it is possible for weld spatter to be captured in the cavity which runs in the base of the recess, and to thereby be prevented from passing into the interior of the high-pressure valve. Downstream components, such as for example injectors, are thereby also effectively protected against contamination.

In some embodiments, an arrangement can be refined in particular for the use of resistance welding processes.

In relation to a weld seam produced radially from the outside, this makes it possible for the weld seam to be formed radially further to the inside. The positive pressure that acts in the hollow interior of the arrangement during the operation thereof cannot act on the high-pressure connector and on the housing outside the weld seam, such that, by way of a weld seam that is situated radially relatively further inward, it is possible to achieve a reduction in size of those surface areas of the high-pressure connector and of the housing which are acted on with pressure during operation and which adjoin the inner cavity. In this way, the overall pressure-loaded area viewed in an axial projection, that is to say in a projection parallel to the central axis, can also be reduced in size, which in turn leads to a relative reduction of the mechanical load acting on the weld seam. This may be advantageous for operating conditions under which particularly high pressures arise in the interior of the arrangement.

In some embodiments, the protruding region widens, in particular conically, at its inner side in the direction of a free longitudinal end of the protruding region, wherein, there, in cross-sectional planes leading through the central axis, the inner surface of said protruding region encloses an angle with the central axis, the magnitude of which angle lies in the range from 10 to 40 degrees and is in particular 30 degrees. In some embodiments, the recess, which runs along the circumferential direction, in the wall is in the form of a groove and, at its inner side, adjoins a surface, which proceeds from the groove mouth, of the wall, which surface, in cross-sectional planes leading through the central axis, runs parallel to the central axis or causes the ring-shaped chamber formed by the groove to narrow, in particular conically, in the direction of the groove base by virtue of the fact that said surface encloses an angle with the central axis, the magnitude of which angle is less than the magnitude of the angle enclosed by the inner surface at the conical widening of the protruding region with the central axis. In some embodiments, the groove mouth has, at the inner side, a diameter which lies in a diameter interval in which the inner surface of the protruding region extends.

In some embodiments, the protruding region is inserted partially into the recess, which runs along the circumferential direction, of the wall, wherein the inner surface of said protruding region is supported against the radially inner rim of the groove mouth, and if the shaping of the outer surfaces of the protruding region and of the recess, which runs along the circumferential direction, in the wall are coordinated with one another such that, in the presence of said support, said surfaces do not come into contact.

In some embodiments, in cross-sectional planes leading through the central axis, said surfaces enclose different angles with the central axis. This makes it possible, at the start of the welding process, for a clearance to be realized between those surfaces of the protruding region which are situated radially further to the outside and the recess, such that an initially undesired current bypass is avoided. To perform capacitor discharge welding, it is possible for the housing and the high-pressure connector to be connected to capacitors of a capacitor discharge welding installation. Capacitor discharge welding makes it possible, even in the presence of increased geometrical and mechanical demands, to realize and maintain an inexpensive welded connection. For the assembly of, for example, an overall pump, the invention furthermore yields additional flexibilization, because it is no longer necessary for accessibility to the weld seam from the outside to be provided.

Usage in high-pressure valve housings, for example valves for camshaft adjustment, servo valves in the high-pressure sector for industrial plants, construction machines, etc. would also be conceivable. In general, all high-pressure ports that can be produced by way of capacitor discharge welding are conceivable. Capacitor discharge welding necessitates conductive and weldable materials.

In some embodiments, an encircling edge may be provided on the housing or on the high-pressure connector, and for the contact pressure for the capacitor discharge welding process to be generated at said edge. The present disclosure also relates to a method for producing an arrangement for a fuel delivery system. In particular, it is sought to achieve that, in this way, the above-described limitations and disadvantages that arise in the prior art can be partially or as far as possible substantially avoided.

In some embodiments, the method comprises the following method steps: providing an arrangement which has some or several of the features described above with regard to said arrangement, arranging the housing and the high-pressure connector such that the protruding region entirely or partially enters the recess, which runs along the circumferential direction, in the wall and said protruding region makes contact with the wall in which the recess extends along the circumferential direction, cohesively connecting the protruding region and the wall, in which the recess extends along the circumferential direction, by way of a welding process with the formation of at least one weld seam, wherein a fixed state is produced between the high-pressure connector and the housing.

In some embodiments, the cohesive connection is performed by way of beam welding, in particular by way of electron beam welding or by way of laser beam welding, and in that, in relation to cross-sectional planes leading through the central axis, the welding beam is directed from the outside toward, and in an in particular rectilinear elongation of, an abutment joint between the high-pressure connector and the wall in which the recess extends along the circumferential direction. It is alternatively possible for a capacitor discharge welding installation to be provided and to be connected to the high-pressure connector and to the housing, and for the cohesive connection to be performed, by way of capacitor discharge welding, proceeding from the contact zone between the groove mouth in the wall and the inner surface of the protruding region.

Some embodiments may include a housing with high-pressure connector welded thereto, said housing being produced by way of an arrangement according to the disclosure and/or by way of a method according to the teachings of the present disclosure.

In some embodiments, an arrangement for a fuel delivery system for a motor vehicle, may include a high-pressure connector and a housing. Out of the high-pressure connector and housing, one has a protruding region and the other has a wall which delimits a recess, the protruding region and the wall can be fixed to one another by way of a welding process, with the formation of a weld seam, and the high-pressure connector has a first region and a second region which each have a predefined geometrical shape such that, in a fixed state of the high-pressure connector and of the housing, forces generated within the high-pressure connector by high pressure that acts during operation of the fuel delivery system are relocated away from the weld seam.

Some embodiments include a central axis, relative to which the protruding region and the wall each have an oblique flank, and the respective oblique flank of the protruding region and of the wall are fixable to one another by way of the welding process with the formation of the weld seam. It is possible for the high-pressure connector to have, along the central axis, a wall which surrounds a recess extending all the way through, and for the first region to be formed on an outer side of the wall and the second region to be formed on an inner side of the wall.

In some embodiments, in the fixed state of the high-pressure connector and of the housing, a parting plane is defined substantially by a contour of the housing perpendicular to the central axis of the high-pressure connector, the first region of the high-pressure connector is formed so as to be axially further remote than the second region from the parting plane in relation to the central axis, and the second region substantially adjoins the protruding region or the wall of the high-pressure connector, wherein the second region is substantially formed so as to be axially further remote than the protruding region or the wall from the parting plane in relation to the central axis. It is possible for the first region and the second region of the high-pressure connector to be of substantially spherical form. The respective oblique flank may be of substantially planar form as viewed in a cross section with respect to the central axis. The respective oblique flank of planar form may have an acute angle in the range from 30° to 60° with respect to the central axis of the high-pressure connector. The wall may have an inner region and an outer region, and the weld seam may be formed between the protruding region and the inner region of the wall by way of a welding process.

In some embodiments, a method for producing an arrangement for a fuel delivery system, may include providing a high-pressure connector which has a central axis, a first region and a second region of predefined geometrical shape, providing a housing, wherein, out of the high-pressure connector and housing, one has a protruding region and the other has a wall which delimits a recess, arranging the protruding region in the recess, wherein the protruding region at least partially makes contact with the wall, and cohesively connecting the protruding region and the wall, with the formation of a weld seam, wherein a fixed state is produced between the high-pressure connector and the housing.

The method may comprise: arranging the protruding region in the recess, wherein the protruding region and the wall each have an oblique flank, and cohesively connecting the oblique flanks with the formation of a weld seam, with a fixed state being produced between the high-pressure connector and the housing. It is possible for the method to comprise cohesive connection in a manner dependent on a geometrical shape of the protruding region and of the wall and/or of the oblique flanks. In some embodiments, the method comprises cohesive connection in a manner dependent on an angle of the oblique flanks with respect to the central axis of the high-pressure connector. It is possible for the method to comprise cohesive connection of the respective oblique flanks at an angle of 30° to 60° with respect to the central axis of the high-pressure connector. It is possible for the welding process to comprise capacitor discharge welding.

In some embodiments, the wall may have an inner region and an outer region, and for the weld seam to be produced between the protruding region and the inner region of the wall during the course of the cohesive connection.

A first exemplary embodiment of an arrangement 1 according to the invention will be presented with reference to FIGS. 1 to 4. The arrangement is an arrangement 1 for a fuel delivery system of a motor vehicle. The arrangement 1 comprises a housing 5 and a high-pressure connector 3. In FIGS. 1 to 4 (aside from FIG. 3a), said two components are shown in a fitted-together position but before the production of a welded connection that connects them to one another. Said position may be realized for example by way of auxiliary fixing aids that are known to a person skilled in the art. The housing 5 has a wall 9 which has a connector opening 2. The high-pressure connector 3 has a wall 17 which borders a recess 15, which extends all the way through the high-pressure connector 3, at the circumference of said recess formed with respect to a central axis 13. Said high-pressure connector is designed as a sleeve with inner and outer diameters which vary along the length (along the central axis).

The high-pressure connector comprises a housing connector region 4, which faces toward the housing 5, an intermediate region 6 and a connector region 8, which may serve for connection to desired fittings, lines or other connection partners and which may bear a thread (not illustrated in the figures) for example on its outer side. A transition region 37 extends between the housing connector region 4 and the intermediate region 6. In cross-sectional planes leading through the central axis, the main direction of extent of said transition region is radial, that is to say perpendicular to the central axis 13. As shown in FIG. 2, said transition region is substantially a section of the wall 17 running in encircling fashion in the manner of a ring-shaped disk.

In the example, the high-pressure connector 3 is of rotationally symmetrical form on its outer side 18 and on its inner side 19. The outer diameter of the high-pressure connector 3 is larger in the housing connector region 4 than in the intermediate region 6. Also, the inner diameter of the high-pressure connector (that is to say the outer diameter of its central recess 15) is larger in the housing connector region 4 than in the intermediate region 6.

In the example, the wall 9 of the housing delimits, at its outer side in relation to the housing, a recess 10 which extends along a circumferential direction and in circumferentially closed fashion around the connector opening 2. The housing connector region 4 comprises a protruding region 7, on which the axial longitudinal end of said housing connector region is situated. As illustrated for example in FIG. 2, the protruding region 7 is geometrically adapted to the encircling recess 10 such that, for the production of a weld seam, said protruding region is suitable for making contact with the housing 5 while simultaneously partially or fully entering the recess. A radial indentation 32 is formed at the inner side in the wall 17 in the housing connector region 4, adjacent to the transition region 37. Furthermore, an axial indentation 31 is formed at the outer side in the wall 17 of the high-pressure connector 3 in the transition region 37, adjacent to the intermediate region 6, which axial indentation forms an undercut.

In cross-sectional planes leading through the central axis 13 (that is to say in cross-sectional planes leading in parallel through the central axis 13, for example in the section plane used in the figures), the axial indentation 31 has, on the circumference or at a respective position of the circumference, a contour which, proceeding from the cylindrical outer side 18 of the wall 17 of the intermediate region 6 in the example (the reference designation generally denotes the outer side of the wall 17, and the reference designation 19 generally denotes the inner side of the wall 17), comprises a rounded portion 12 and a straight portion 14 adjoining the rounded portion 12, wherein the straight portion 14 leads to an outer side 18, which is perpendicular to the central axis 13, of the wall 17 of the transition region 37. In the rounded portion 12, the outer surface of the wall 17 is concavely domed with respect to said cross-sectional planes.

In cross-sectional planes leading through the central axis 13, the radial indentation 32 has, on the circumference, that is to say at a respective position of the circumference, a contour 16 which is continuously rounded within the cross-sectional planes. Owing to said rounded contour 16, the inner surface of the wall 17 there is concavely domed with respect to cross-sectional planes perpendicular to the central axis 13. In the example, that is to say in a manner which is not imperative, a uniform radius of curvature has been selected within the contour 16.

As illustrated for example in FIG. 2, in the selected exemplary embodiment, viewed in an axial projection, that is to say viewed in a projection parallel to the central axis 13, the radial indentation 32 is situated radially outside the axial indentation 31. The radial indentation 32 adjoins the protruding region 7. In a direction parallel to the central axis 13, the axial indentation 31 is spaced apart further than the radial indentation 32 from that surface of the housing 5 which faces toward the high-pressure connector 3, or from the housing front plane 25 of the housing 5. As already discussed, the high-pressure connector 3 and the housing are illustrated in a relative position with respect to one another in which the two components are to be connected to one another by way of a welding process. In the exemplary embodiment shown in FIG. 2, it is provided that, when the protruding region 7 has been inserted to the greatest possible extent into the recess running along the circumferential direction, the protruding region 7, along the circumference, in each case a really adjoins two mutually inclined surfaces of the wall 9.

The protruding region 7, at its outer side 18, narrows conically in the direction of its free longitudinal end 20. There, in cross-sectional planes leading through the central axis 13, (cf. FIGS. 2 and 4), the outer surface 21 encloses an angle α with the central axis 13 or with the geometric (imaginary) elongation thereof, the magnitude of which angle is, in the example, 45°.

The recess 10, which runs along the circumferential direction around the central axis 13, in the wall 9 of the housing 5 is in the form of a groove 22. The ring-shaped chamber formed by the groove 22 narrows conically at its outer side (that is to say at that side of its two sides which is situated radially further to the outside) in the direction of the groove base. In the exemplary embodiment shown in FIGS. 1 to 4, in cross-sectional planes leading through the central axis 13 running in the longitudinal direction, that surface 23 of the wall 9 of the housing which borders the outer side of the groove 22 encloses an angle β with a geometric elongation of the central axis 13, the sign and magnitude of which angle β correspond to those of the angle α. Viewed in an axial projection, the two surfaces 21, 23 extend in overlapping fashion in a common diameter interval. FIG. 2 illustrates that a straight geometric elongation 24, leading away from the housing 5, of the conical contact zone between the surfaces 21, 23 geometrically does not intersect the housing 5.

In the exemplary embodiment shown in FIGS. 1 to 4, the protruding region 7 has, on its inner side, a cylindrical surface 26. The encircling recess 10 in the form of a groove 22 adjoins a likewise cylindrical surface 27 of the wall 9, wherein the two cylindrical surfaces 26, 27 have the same diameter in order to realize a centering action. In cross-sectional planes leading through the central axis 13, the contours of the protruding region 7 and of the recess 10 running along the circumferential direction are geometrically coordinated with one another such that the protruding region is insertable entirely into the recess 10 which runs along the circumferential direction (as shown for example in FIG. 2). In said position, the protruding region 7 bears a really by way of its outer surface 21 against the outer surface 23 of the wall 9 within the recess 10 and bears a really by way of its inner surface 26 against the inner surface 27 of the wall 9 in the recess 10.

In the perspective view of FIG. 1, it is shown that the housing 5 has, owing to existing requirements, a housing collar 34 which, for particular applications, may be connected to a clamping flange 36 in a manner not illustrated in any more detail in the figures. At a time at which the high-pressure connector 3 is to be fixed to the housing 5 by way of a welding process, the clamping flange 36 is not attached to the housing collar 34. In this regard, FIG. 2 illustrates that, when the clamping flange 36 is not present, the contact zone formed by the surfaces 21, 23 is accessible from the outside, in the rectilinear elongation thereof, that is to say in the direction of the arrow 28 shown by way of example, for a welding head of a beam welding apparatus. It is thus possible for a weld seam 11 (the position of which is schematically shown in FIG. 3) to be produced from the outside, along the entire circumference, by way of a beam welding process with a beam direction which is aligned with the contact zone and which encloses an angle of 45 degrees with the central axis 13.

FIG. 3a shows the extract also selected in FIG. 3 for the detail enlargement. By contrast to FIG. 3, it is the case in FIG. 3a that, in the region of the wall 17 and of the wall 9, a schematic hatching has been selected which varies within each of said walls. Here, relatively dense hatching indicates that, during the operation of the arrangement 1, when a pressure higher than that outside the high-pressure connector 3 prevails in the recess 15 for operational reasons, relatively higher mechanical stresses are generated in the respective region than in regions in which the hatching lines are spaced relatively further apart. These relationships have been proven by calculations. It is clear from this that higher mechanical stresses act in the wall regions adjoining the axial indentation 31 and the radial indentation 32 than in the region of the weld seam 11. The mechanical stresses acting in the region of the weld seam 11 are lower than the mechanical stresses that would act there in the presence of equal operational loading in the case of a high-pressure connector 3 which does not have the axial indentation 31 and the radial indentation 32 but which otherwise corresponds to the high-pressure connector 3 shown in FIGS. 1 to 4.

With regard to FIGS. 5 and 6, a second and a third, similar exemplary embodiment of an arrangement 1 according to the teachings of the present disclosure will be presented. In said figures, for a clearer overview, features which correspond or are similar to features of the first exemplary embodiment are denoted by the same reference designations.

By contrast to the first exemplary embodiment, it is provided here that the protruding region 7 conically widens at its inner side in the direction of its free longitudinal end. There, in cross-sectional planes leading through the central axis 13 (as for example in FIG. 6), the inner surface 26 of said protruding region encloses an angle γ with the central axis 13 or with the geometric elongation of said central axis, the magnitude of which angle, in the example, amounts to between 15° and 20°, though could also amount to, for example, 30°.

The recess 10, which runs along the circumferential direction, is again in the form of a groove 22. At its inner side, said recess adjoins a surface 29, which proceeds from the groove mouth, of the wall 9, which surface, in cross-sectional planes leading through the central axis 13, runs parallel to the central axis 13. The groove mouth has, at the inner side, a diameter d which lies in a diameter interval predefined by the smallest diameter and the largest diameter of the inner surface 26 of the protruding region 7. It results from this that, in the case of a central alignment and axial approach, the surface 26 strikes the circularly encircling edge, formed by the inner side of the groove mouth, of the wall 9, wherein contact is realized which is practically merely punctiform in cross section.

In said state, shown in FIG. 5, it is the intention for the high-pressure connector 3 and the housing 5 to be fixed to one another by way of a welding process. As is also shown in FIG. 5, it is the case that the protruding region 7 has, owing to the resulting contact, only partially entered the recess 10. The shaping of the outer surfaces 21, 23 of the protruding region 7 and of the recess 10, which runs along the circumferential direction, are geometrically coordinated with one another such that, in the presence of said support, that is to say before the welding process has begun, said surfaces do not come into contact. In the example shown in FIG. 5, it is provided that, in cross-sectional planes leading through the central axis 13, the surfaces 21, 23 enclose different angles with the central axis. The arrangement 1 shown in FIG. 5 is therefore particularly suitable for a connection of the two components by way of a resistance welding process, for example by way of the capacitor discharge welding process. A welding installation of said type is not illustrated in the figures.

In order for the high-pressure connector 3 to be fixed, in the arrangement shown in FIG. 5, to the housing 5 by way of capacitor discharge welding (so-called CD welding), the high-pressure connector can be pushed firmly against the wall 9 of the housing 5 parallel to the central axis 13, that is to say axially, such that the conical surface 26 is supported firmly against the rim 30 or against the front edge of the groove mouth (see groove 22), that is to say a high contact pressure is generated. The pressing force is symbolically denoted by F in FIG. 5.

The high-pressure connector 3 and the housing 5 may be connected, in a manner known per se to a person skilled in the art, to an installation for capacitor discharge welding. The current flow, effected by the capacitor discharge, through the initially very limited contact zone leads to heating and melting of the metal there, which ultimately leads to the desired cohesive connection.

At the start of the welding process, there is no contact between the surfaces 21 and 23 situated radially further to the outside, as is also shown in FIG. 5. In this way, in the first step, a clearance is provided in order that, during the welding process, an undesired current bypass is avoided.

Depending on requirements, it is possible, subsequently or in a further step, for the welding process to be continued and for the protruding region 7 to be caused, in targeted fashion, to abut by way of its surface 21 against the outer surface 23 of the wall 9 of the housing 5 by virtue of the fact that the high-pressure connector, during the melting in the welding zone, should perform a follow-up sliding movement equal in extent to that of the molten material. Said desired extent should be kept in reserve as a contact gap in order that the abutment at said outer contact zone, and thus the bypass, is realized for the first time when the connecting process itself has been completed. In this way, it would be possible for an additional support action on the outer side of the high-pressure connector 3 against the housing 5 to be realized.

In comparison with the first exemplary embodiment described with reference to FIGS. 1 to 4, it is clear that, in the example of FIG. 5, the weld seam extends as far as a radial spacing, denoted in FIG. 5 by a, to the central axis 13. In FIG. 5, A denotes the radial spacing of the start of an assumed weld seam, produced from radially outside, to the central axis 13. The spacing a is smaller than the smallest radial spacing as far as which a weld seam produced between the surfaces 21, 23 by way of beam welding (for example electron beam or laser beam welding) from the outside would extend. This means that, after the capacitor discharge welding, which is preferred proceeding from FIG. 5, the weld seam which begins already at the rim 30 has the effect that the positive pressure which prevails in the interior during operation cannot act between the surfaces of the protuding region 7 and of the recess 10.

In this way, in relation to an assumed situation in which a weld seam is produced from radially outside, it is the case that, viewed in an axial projection, that is to say a projection parallel to the central axis 13, the projected axial surface area, which is acted on by the internal pressure, of the high-pressure connector and of the housing in the interior of the arrangement is reduced in size. This in turn leads to a relatively reduced pressure loading, and consequently also to lower mechanical stresses acting on the weld seam. By way of the thus optimized geometry, the invention makes it possible for the weld seam to be produced by way of capacitor discharge welding in a region which is inaccessible from the outside, and thus for the weld seam root to be relocated closer to the central axis 13 of the construction. By way of the minimization, which is possible here, of the axial projected surface area which is acted on with pressure, the weld seam is subjected to relatively low loading as a result.

The further exemplary embodiment shown in FIG. 6 corresponds, aside from minor design modifications, to the exemplary embodiment shown in FIG. 5.

FIG. 7 shows, in an external view, an arrangement 1' known from the prior art, which arrangement comprises a housing 5' and a high-pressure connector 3' for fixing to the housing 5' by way of a welding process. In the interior of the high-pressure connector 3', a recess 15' extends all the way through along a central axis 13'. The wall is denoted by 17', and the outer side thereof is denoted by 18'. The housing 5' has a housing front plane 25' which points toward the high-pressure connector 3'. In said known arrangement, the housing front plane 25' simultaneously marks a straight parting plane between the two components. If said components are to be connected to one another by way of a beam welding process, it is possible for a weld seam to be produced from the outside along the parting joint by way of a welding head directed perpendicular to the central axis 13' (see direction of the arrow 28').

What is claimed is:

1. An apparatus for a fuel delivery system for a motor vehicle, the apparatus comprising:
   a housing including a first wall with a connector opening; and
   a high-pressure connector for fixing to the housing by way of a welding process, the high-pressure connector including a second wall circumferentially bordering a recess extending along a longitudinal central axis of the high-pressure connector;
   the high-pressure connector including a housing connector region having a first internal passage, an intermediate region having a second internal passage with an inner diameter smaller than the first internal passage, and a transition region connecting the first internal passage to the second internal passage with a third internal passage narrowing from the first internal passage to the second internal passage;
   wherein, in cross-sectional planes perpendicular to the longitudinal central axis, a first outer diameter of the high-pressure connector extends over both the housing connector region and the transition region and into part of the intermediate region, the first outer diameter larger than a second outer diameter in another part of the intermediate region;
   wherein the first wall delimits, at its outer side, a recess running along a circumferential direction, in a circumferentially closed fashion, around the connector opening; and
   the housing connector region of the connector includes a protruding region suitable for making contact with the housing when said protruding region partially or fully enters the recess;
   a radial indentation formed at the inner side in the second wall in the housing connector region adjacent to the transition region; and
   an axial groove formed at the outer side in the second wall in the transition region adjacent to the intermediate region;
   wherein the protruding region, at the outer side, narrows conically in the direction of a free longitudinal end of the protruding region;
   in cross-sectional planes leading through the central axis, the outer surface of the protruding region encloses an angle with an imaginary elongation of the central axis, the magnitude of which angle lies in the range from 10 to 80 degrees.

2. The apparatus as claimed in claim 1, wherein the high-pressure connector has a rotationally symmetrical form.

3. The apparatus as claimed in claim 1, wherein, in cross-sectional planes leading through the central axis, the axial groove includes a contour with a rounded portion proceeding from the outer side of the second wall and with a straight portion adjoining the rounded portion and leading to the outer side of the wall in the transition region.

4. The apparatus as claimed in claim 1, wherein:
   the recess in the first wall includes a groove; and
   a ring-shaped chamber formed by the groove narrows conically at its outer side in the direction of the groove base.

5. The apparatus as claimed in claim 1, wherein:
   in cross-sectional planes leading through the central axis, a surface of the wall of the housing bordering the outer side of the groove encloses a first angle formed with an elongation of the central axis;
a sign and magnitude of the angle corresponding to those of a second angle enclosed by the outer surface of the protruding region with an elongation of the central axis; and
the two surfaces extend in the same diameter interval.

6. The apparatus as claimed in claim 1, further comprising a geometric elongation, leading away from the housing, of a conical contact zone between an outer side of the protruding region and an outer side of the recess running along the circumferential direction geometrically does not intersect the housing.

7. The apparatus as claimed in claim 1, wherein:
the protruding region includes, on an inner side, a cylindrical surface;
the recess in the wall has the form of a groove and, at an inner side, adjoins a cylindrical surface of the wall; and
the two cylindrical surfaces have an equal or approximately equal diameter.

8. The apparatus as claimed in claim 1, wherein:
in cross-sectional planes leading through the central axis, contours of the protruding region and of the recess in the wall of the housing are coordinated with one another such that the protruding region is insertable or inserted at least partially into the recess, which runs along the circumferential direction, in such a way that said protruding region bears by way of its outer surface against the outer surface of the wall in the recess and bears by way of its inner surface against the inner surface of the wall in the recess.

9. The apparatus as claimed in claim 1, further comprising, when the protruding region has been inserted as far as possible into the recess running along the circumferential direction, a remaining cavity within the recess, the cavity adjoining the free longitudinal end of the protruding region.

10. The apparatus as claimed in claim 1, wherein:
the protruding region widens conically at its inner side in the direction of a free longitudinal end of the protruding region; and
there, in cross-sectional planes leading through the central axis, an inner surface of said protruding region encloses an angle with the central axis, a magnitude of the angle within the range from 10 to 40 degrees.

11. The apparatus as claimed in claim 1, wherein the recess in the wall has in the form of a groove and, at an inner side, adjoins a surface of the wall proceeding from a groove mouth, which surface, in cross-sectional planes leading through the central axis, runs parallel to the central axis or causes a ring-shaped chamber formed by the groove to narrow conically in the direction of a groove base by virtue of the fact that said surface encloses a first angle with the central axis, and
wherein a magnitude of the first angle is less than a magnitude of a second angle enclosed by the inner surface at the conical widening of the protruding region with the central axis.

12. The apparatus as claimed in claim 1, wherein a groove mouth includes a diameter, measured at an inner side, disposed in a diameter interval in which the inner surface of the protruding region extends.

13. The apparatus as claimed in claim 1, further comprising:
the protruding region inserted at least partially into the recess of the wall;
the inner surface of said protruding region is supported against a radially inner rim of the groove mouth;

the shaping of the outer surfaces of the protruding region and of the recess in the wall are coordinated with one another such that, in the presence of said support, said surfaces do not come into contact; and
in cross-sectional planes leading through the central axis, said surfaces enclose different angles with the central axis.

14. A method for manufacturing an apparatus for a fuel delivery system, the apparatus comprising:
a housing including a first wall with a connector opening; and
a high-pressure connector for fixing to the housing by way of a welding process, the high-pressure connector including a second wall circumferentially bordering a recess extending along a longitudinal central axis of the high-pressure connector;
the high-pressure connector including a housing connector region having a first internal passage, an intermediate region having a second internal passage with an inner diameter smaller than the first internal passage, and a transition region connecting the first internal passage to the second internal passage with a third internal passage narrowing from the first internal passage to the second internal passage;
wherein, in cross-sectional planes perpendicular to the longitudinal central axis, a first outer diameter of the high-pressure connector extends over both the housing connector region and the transition region and into part of the intermediate region, the first outer diameter larger than a second outer diameter in another part of the intermediate region;
wherein the first wall of the housing delimits, at its outer side, a recess running along a circumferential direction, in a circumferentially closed fashion, around the connector opening; and
the housing connector region includes a protruding region suitable for making contact with the housing when said protruding region partially or fully enters the recess;
a radial indentation formed at the inner side in the second wall in the housing connector region adjacent to the transition region; and
an axial groove formed at the outer side in the second wall in the transition region adjacent to the intermediate region;
the method comprising:
arranging the housing and the high-pressure connector such that the protruding region at least partially enters the recess running along the circumferential direction and said protruding region makes contact with the wall in which the recess extends along the circumferential direction;
cohesively connecting the protruding region and the wall by way of a welding process, wherein a fixed state is produced between the high-pressure connector and the housing;
wherein the protruding region, at the outer side, narrows conically in the direction of a free longitudinal end of the protruding region;
in cross-sectional planes leading through the central axis, the outer surface of the protruding region encloses an angle with an imaginary elongation of the central axis, the magnitude of which angle lies in the range from 10 to 80 degrees.

15. The method as claimed in claim 14, wherein: the cohesive connection is performed by way of electron beam welding or by way of laser beam welding; and in relation to cross-sectional planes leading through the central axis, the welding beam is directed from the outside toward, and in an in particular rectilinear elongation of, an abutment joint.

16. The method as claimed in claim 14, further comprising:
   connecting a capacitor discharge welding installation to the high-pressure connector and to the housing; and
   performing the cohesive connection by way of capacitor discharge welding, proceeding from the contact zone between the groove mouth in the wall and the inner surface of the protruding region.

17. The apparatus as claimed claim 1, wherein, in cross-sectional planes leading through the central axis, the radial indentation includes a continuously rounded contour.

18. The apparatus as claimed in claim 1, further comprising:
   when viewed in an axial projection, the radial indentation situated radially outside the axial groove, or the radial indentation adjoining the protruding region or, in a direction parallel to the central axis, the axial groove spaced apart further than the radial indentation from a surface of the wall of the housing facing toward the high-pressure connector; and wherein the radial indentation adjoins the surface of the wall when the protruding region has been inserted into the recess running along the circumferential direction.

* * * * *